United States Patent [19]
Deville

[11] Patent Number: 5,897,268
[45] Date of Patent: Apr. 27, 1999

[54] DEVICE FOR ASSEMBLING AND LOCKING TWO TUBES, AND ITS APPLICATION TO THE MANUFACTURE OF A TELESCOPIC ROD

[75] Inventor: Antoine Deville, Le Vieil Bauge, France

[73] Assignee: Deville Sa Secateurs Pradines, Bauge, France

[21] Appl. No.: 08/807,472

[22] Filed: Feb. 27, 1997

[30] Foreign Application Priority Data

Mar. 1, 1996 [FR] France .................................. 96 02 630

[51] Int. Cl.$^6$ .......................................... F16B 7/10
[52] U.S. Cl. ..................... 403/109.5; 403/109.1; 403/374.4
[58] Field of Search ...................... 403/109, 374

[56] References Cited

U.S. PATENT DOCUMENTS

| | | | |
|---|---|---|---|
| 2,261,505 | 11/1941 | Schlesinger | 403/374 X |
| 2,291,747 | 10/1942 | Neuwirth . | |
| 2,494,878 | 1/1950 | Jensen | 403/109 X |
| 3,198,562 | 8/1965 | Smith | 403/374 X |
| 4,134,703 | 1/1979 | Hinners | 403/374 X |
| 4,238,164 | 12/1980 | Mazzolla | 403/109 |
| 5,085,063 | 2/1992 | Van Dyke et al. | 403/374 X |
| 5,232,304 | 8/1993 | Huang | 403/374 |

FOREIGN PATENT DOCUMENTS

| | | |
|---|---|---|
| 0314357 | 5/1989 | European Pat. Off. . |
| 2432424 | 2/1980 | France . |

*Primary Examiner*—Anthony Knight
*Attorney, Agent, or Firm*—Young & Basile, P.C.

[57] ABSTRACT

A device for assembling and locking two tubes has a radially symmetrical central member having a cylindrical screwthread on a front part and a cylindrical peg at the rear. The latter is inserted in a first tube. The front part is covered by two half-shells with a cylindrical outside wall, bearing on each other along a rectilinear ramp surface. One of the half-shells is unable to move in translation. The other is entrained in translation by the screwthread when the tube is rotated, which tends to move the two half-shells away from the central member, although they remain parallel to each other, until they come into contact with the inside wall of the second tube. The contact surface is cylindrical. The invention is useful, for example, in manufacture of telescopic rods.

12 Claims, 2 Drawing Sheets

DEVICE FOR ASSEMBLING AND LOCKING TWO TUBES, AND ITS APPLICATION TO THE MANUFACTURE OF A TELESCOPIC ROD

BACKGROUND OF THE INVENTION

1. Field of the Invention

The invention concerns a device for assembling and locking two tubes, in particular two tubes sliding one within the other.

It is more particularly concerned with a device for assembling and locking tubes in which locking is obtained by relative rotation of the tubes about a common axis of symmetry.

It also concerns the application of a device of this kind to the manufacture of a telescopic rod.

In the context of the invention, the expression "telescopic rod" must be understood in its widest sense: rod proper, sliding mast, etc.

By way of non-exhaustive example, the field of application of a telescopic rod of this kind concerns gardening. The telescopic rod may be fitted at one end with a tool of the secateurs or similar type, for example.

2. Description of the Prior Art

Many devices for assembling and locking two tubes of the above (rotational) type are known in themselves.

A first device known in itself comprises an eccentric cam and screw system. Upon relative rotation of the two tubes, the cam comes into contact with one of the tubes and frictionally engages its inside wall. However, this device is very complex and therefore costly and is of limited effectiveness. The contact area is small, resulting in a low coefficient of friction. Also, the cam being small, the mechanical strength is low.

Another known device comprises a screwthreaded central member surrounded by two half-cylinders. To be more precise, the screwthread is conical and entrains the two members when the central member is rotated about its axis of symmetry. The two half-cylinders are then moved apart angularly like two wings, and their ends frictionally engage the inside wall of one of the tubes.

FIGS. 1 and 2 appended to this description show a prior art device of this kind in diagrammatic form.

The assembly and locking device comprises a central member 1 in two parts: a screwthreaded front part 11 and a rear cylindrical sleeve 10. The latter fits in a first tube $T_1$ sliding in a second tube $T_2$ the inside diameter of which is slightly greater than the outside diameter of the first tube $T_1$. The first tube $T_1$ abuts on a ring 14 separating the screwthreaded front part 11 from the cylindrical rear sleeve 10. The two tubes $T_1$ and $T_2$ and the central member 1 have a common axis of symmetry Δ.

As already indicated, the screwthread 15 of the front part 11 is on a conical surface. The end of the screwthreaded front part 11 has an annular abutment 13 and the diameter of the screwthread 15 in this area is smaller than in the area near the annular abutment 14.

The screwthreaded front part 11 is surrounded by an assembly 2 comprising two contiguous half-cylinders 20 and 21. At the end near the cylindrical abutment 13 they have a peripheral groove 23 so that they may be retained by an elastic band 3 or similar means.

FIG. 1 shows the assembly and locking device in an initial state. In this state the two half-cylinders are abutted against the ring 13 and are inscribed within a cylinder having a diameter less than the inside diameter of the tube $T_2$. Accordingly, the assembly can slide freely in a direction parallel to the previously mentioned axis of symmetry Δ.

In FIG. 1 the tubes $T_1$ and $T_2$ are shown in longitudinal section. The half-cylinder 20 is partly cut away in order to show more clearly how it cooperates with the screwthread 15. To be more precise, each half-cylinder has a raised pattern on its inside wall adapted to mesh with the screwthread 15. In FIG. 1 only the raised pattern 200 on the half-cylinder 20 can be seen.

As shown more particularly in FIG. 2, when a rotation R is imparted to the tube $T_1$ the latter entrains the central member 1. It is assumed that the cylindrical sleeve 10 is forcibly fitted into the tube $T_1$ and that the latter has fixing means, not shown, such as screws or similar means. The raised patterns associated with the two half-cylinders 20 and 21, for example the raised pattern 200, are entrained by the rotation imparted to the screwthread 15. It follows that the combination of the two half-cylinders 20 and 21 will move in translation towards the abutment 14, i.e. parallel to the axis of symmetry (arrow f). The raised patterns (for example 200) bearing on the surface of the screwthreaded area 11 and the latter itself being conical, the diameter increasing in the direction towards the abutment 14, the two half-cylinders 20 and 21 move apart at the end near the abutment 14. They are held close together at their other end by the elastic band 3.

It follows that the two half-cylinders 20 and 21 will come into contact with the inside wall of the tube $T_1$ and apply pressure to it. This achieves the assembly and locking of the two tubes $T_1$ and $T_2$.

This device requires only low-cost, for example plastics material, parts, allowing manufacture by injection molding.

However, it is readily apparent from FIG. 2, which shows the device in the locked state, that the areas in which the bearing forces, and therefore the friction, are exerted are very small: end areas $Z_{20}$ for the half-cylinder 20 and $Z_{21}$ for the half-cylinder 21. It follows that the locking is somewhat unreliable. Furthermore, as the device relies on a buttress effect, there is a real risk of the components breaking if the two half-cylinders 20 and 21 are subjected to an excessively high force, i.e. if the relative rotation of the two tubes $T_1$ and $T_2$ is accentuated to increase the areas of contact.

SUMMARY OF THE INVENTION

An aim of the invention is a device retaining the advantages of the device just described but that does not have its drawbacks, some of which have been described.

In the device in accordance with the invention, a cylindrical bearing engagement on the inside wall of the tubes to be assembled and locked greatly increases the friction area and eliminates the risk of breaking of the bearing members.

To this end, a central member having a screwthreaded area inscribed within a cylinder and two cylindrical half-shells surrounding this central member are used.

In one important aspect of the invention, the two half-shells are made from cylindrical tubes that are cut in a plane inclined to the axis of symmetry of the cylinders. This cutting plane thus forms an inclined plane enabling relative movement in translation of the two half-shells in a direction parallel to the aforementioned axis. In the initial, or rest, state, the two half-shells form a cylinder. When they slide on each other, they also move away from the axis of symmetry, whilst remaining parallel to each other. It is the screwthread of the central part which, when rotated, brings about this combined movement in translation and separation. If this assembly is inserted in a tube, the two half-shells come into contact with the inside wall of the tube and apply pressure along all of the length of the half-shells, not just at their ends.

In a preferred variant of the invention two elastic lugs are provided on one of the half-shells, for self-locking of the device in one of the tubes, to avoid all risk of slippage when the aforementioned rotation is applied.

Thus the invention consists in a device for assembling and locking two tubes by relative rotation thereof about a common axis, comprising a central member that is radially symmetrical about said axis and has a front part provided with a cylindrical screwthread over at least a portion of its length and a rear part adapted to be inserted into a first tube, and two wedge-shape semi-cylindrical shells with rectilinear ramp surfaces surrounding said front part and disposed head-to-tail, said rectilinear ramp surfaces forming a particular angle with said common axis, said front part being surrounded by said two semi-cylindrical shells and inserted in a second tube, said two shells bearing against each other through the intermediary of said rectilinear ramp surfaces in a first, unlocked, state enabling movement in translation of said front part parallel to said common axis inside said second tube, at least one second shell having an inside rib adapted to mesh in said cylindrical screwthread so that said shell is entrained in translation parallel to said common axis when rotation is imparted to said central member about said axis, to cause said shells to straddle each other, by sliding on said ramp surfaces, and to move them progressively apart to bring about a second, locked, state in which outside walls of said shells come into bearing engagement with a cylindrical portion of the inside wall of said second tube.

The invention also consists in the application of a device of the above kind to the manufacture of a telescopic rod.

The invention evidently has a number of advantages, including:
  the friction area is much larger than in the prior art devices;
  clamping and unclamping are gentle and progressive because of the presence of the inclined planes;
  all of the components are particularly simple and may be made by injection molding of plastics material;
  in the preferred embodiment, the self-locking system avoids all risk of slippage.

The invention will be better understood and other features and advantages will emerge from a reading of the following description, which is given with reference to the accompanying drawings.

DETAILED DESCRIPTION OF THE PREFERRED EMBODIMENTS

To provide a more concrete example, the following description initially refers to the preferred application of the invention, namely a telescopic rod. A system of this kind comprises at least two tubes of different diameter sliding one within the other.

Figure 3:
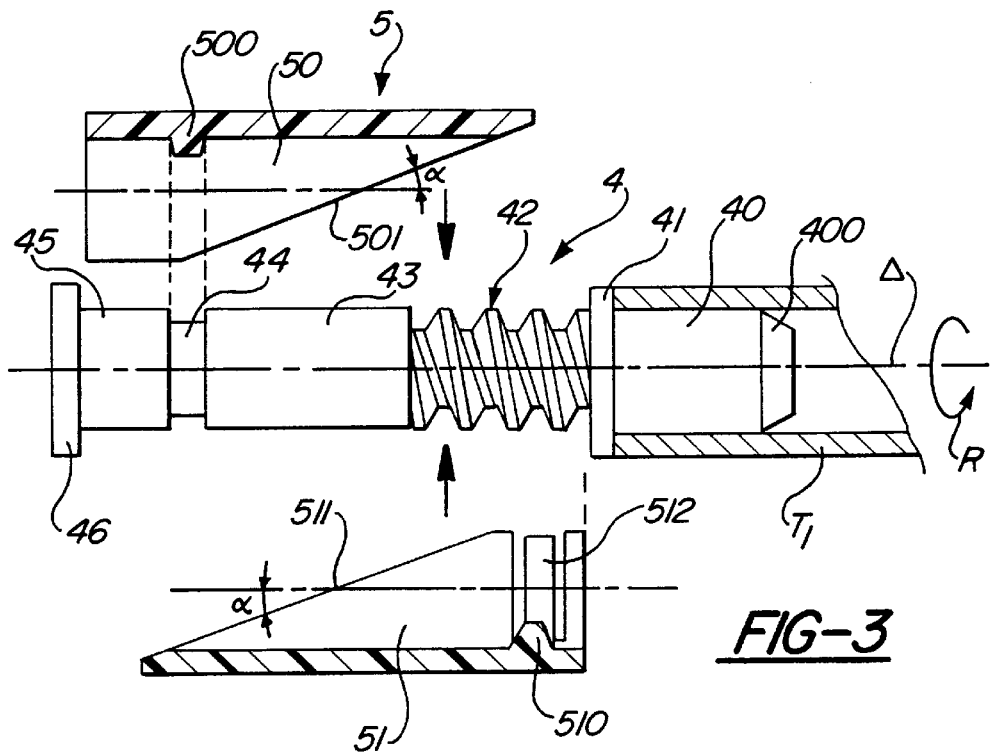
FIG. 3 shows one example of a preferred embodiment of a device in accordance with the invention for assembling and locking two tubes.

FIG. 3 is an exploded view of the components of the assembly and locking device of the invention. As in the prior art, it comprises three main components: a central member 4 and an assembly 5 made up of two half-shells 50 and 51 surrounding the central member 4.

The central member 4 has a rear peg 40 that advantageously has a frustoconical end 400 to facilitate its forcible insertion into a first tube $T_1$. As in the prior art, additional means of fixing the rear peg 40 into the tube $T_1$ may be provided, for example screws (not shown in FIG. 3). The tube $T_1$ abuts against a first flange 41 the diameter of which is advantageously equal to the outside diameter of the tube $T_1$.

The front part of the central member 4 is divided into a number of areas: a screwthreaded area 42 contiguous with the flange 41, a cylindrical area 43, a peripheral groove 44, another cylindrical area 45 and a second peripheral flange 46 at the end, the same diameter as the first flange 41.

In accordance with an important feature of the invention, the screwthreaded area is inscribed within a cylinder rather than a cone.

Two shells or rather half-shells 50 and 51 forming respective wedges are disposed around the front part of the central member 4. It should be understood that the concepts "front" and "rear", as employed hereinafter, are arbitrary and used with the aim of facilitating the description. The two half-shells have semi-cylindrical outer walls. The relative dimensions of the half-shells 50 and 51, on the one hand, and of the front part of the central member, on the other hand, are such that in the initial or unlocked state shown more particularly in FIG. 4a they bear against each other along two respective rectilinear ramp surfaces 501 and 511.

Figure 1:
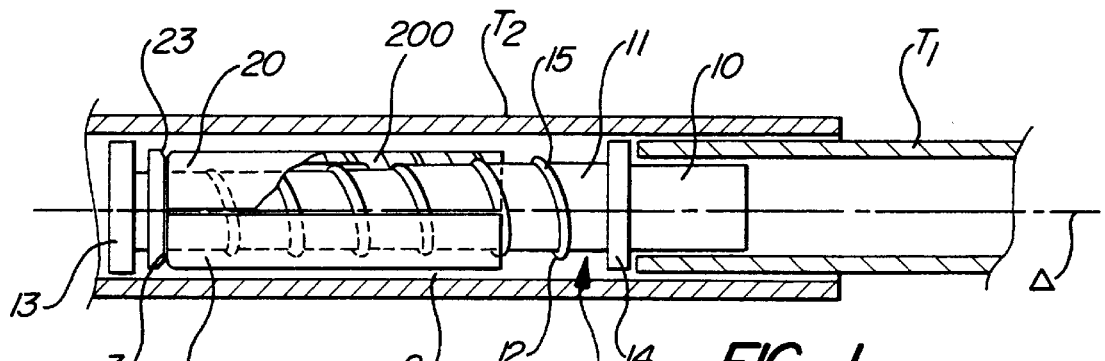
FIGS. 1 and 2 show one example of a prior art device.
Figure 2:
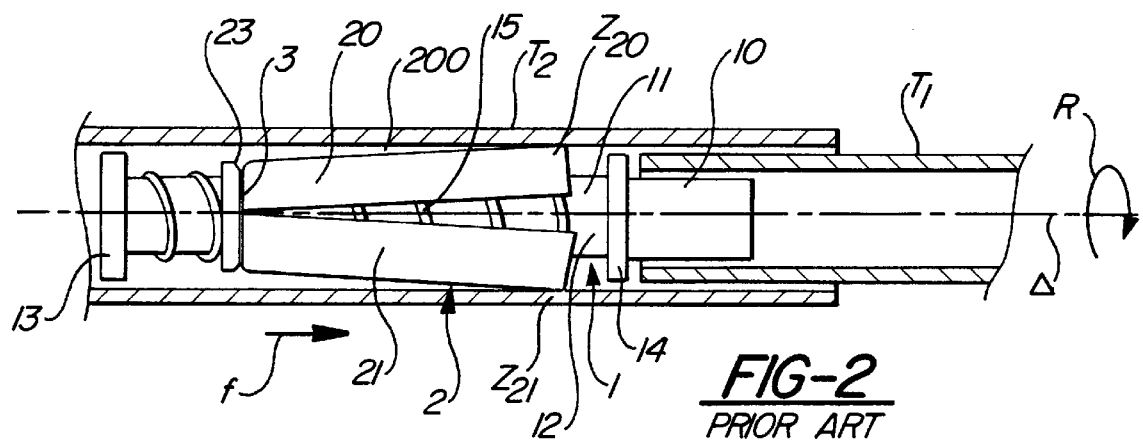
Figure 4A:
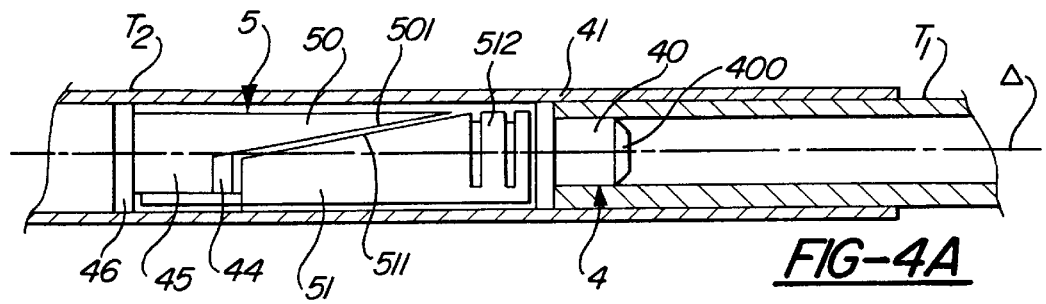
FIGS. 4a and 4b respectively show the unlocked and locked positions of this device.

In the state shown in FIG. 4a the assembly may be freely inserted into a second tube $T_2$ that has to be locked to the tube $T_1$. As in the prior art device shown in FIGS. 1 and 2, the tube $T_2$ naturally has an inside diameter slightly greater than the outside diameter of the tube $T_1$, so that the latter can slide and so that the overall dimension of the rod (the total dimension of the two tubes telescoped together) can be adjusted. The outside diameter of the half-shells 50 and 51 is substantially equal to the inside diameter of the tube $T_2$.

Referring again to FIG. 3, it is seen that the first half-shell 50, shown in section, advantageously has a rib 500 on the inside face of its rear part. This is intended to cooperate with the groove 44, in which it is engaged. This arrangement prevents movement in translation of the half-shell 50, i.e. movement in a direction parallel to the axis of symmetry $\Delta$ of the device, common to the tubes $T_1$ and $T_2$. On the other hand, it allows relative rotation of the half-shell 50 around the central member 4. In reality it is the central part that turns about the axis of symmetry $\Delta$ as explained hereinafter.

In the initial, i.e. unlocked, state, the two half-shells 50, 51 bear one on the other along the ramps 501 and 511, as already indicated, and also abut against the flanges, the half-shell 50 against the flange 46 and the half-shell 51 against the flange 41. In other words, they cover substantially all of the space between the two flanges 41 and 46.

The second half-shell 51 similarly has a rib 510 on its inside face at its rear end. This rib 510 meshes with the screwthread 42.

Figure 4B:
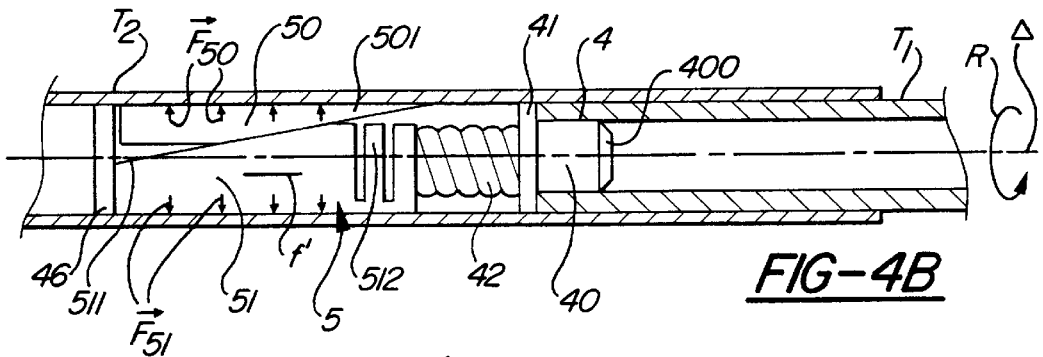

When the rotation R is imparted to the screwthread 42, as shown more particularly in FIG. 4b, this rib is entrained in translation towards the flange 46, i.e. the end of the front part of the central member. Accordingly, the half-shell 51 is also entrained in translation in the same direction (arrow f). The rectilinear ramp surfaces 501 and 511, respectively, of the two half-shells 50 and 51, being in contact in the initial state (see FIG. 4a), slide one on the other. These ramp surfaces are at an angle α to the axis of symmetry Δ that is typically in the order of 20° to 30°.

The half-shell 50 is prevented from moving in translation by the rib 500 engaged in the groove 46 and therefore remains abutted against the flange 46. Thus only the half-shell 51 is able to move in translation in a direction parallel to the axis Δ and towards the flange 46, i.e. the end of the front part. It also follows that, whilst remaining parallel to each other, the two half-shells will move away from the axis of symmetry and that their outside walls will move towards the inside wall of the tube $T_2$, with a wedging effect, until contact is established.

FIG. 4b shows the situation at the end of this movement. The area of contact between the tube (inside wall) and the two half-shells (outside walls) is evidently very large, since it is a substantially cylindrical surface. The resulting friction forces $F_{50}$ and $F_{51}$ are also high. Furthermore, if the angle α is not too great, clamping and unclamping are very gentle and progressive. This latter operation is achieved simply by relative rotation of the two $T_1$ and $T_2$ in the opposite direction to that required for clamping (R).

Note that the screwthread is preferably a "lefthand" thread.

The device just described fulfills its assigned functions perfectly. Nevertheless, there remains a risk of slippage at the commencement of clamping.

To avoid this problem, self-locking elastic means are provided in one preferred embodiment of the invention. These self-locking means may advantageously comprise at least one preferably two, elastic tongue(s) disposed on the mobile half-shell 51, to be more precise at the end of the latter nearer the flange 41.

Figure 5:
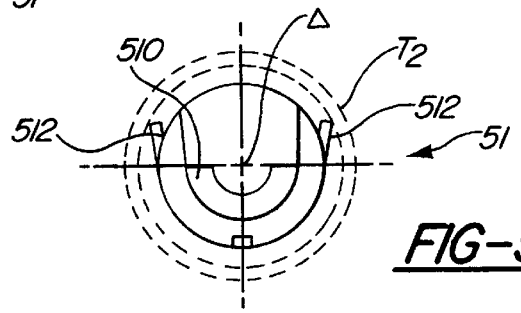
FIG. 5 is an end view of the second half-shell of the device from FIG. 3.

The tongues 512 are shown in FIGS. 3 through 4b and also in FIG. 5. This is a rear view of the half-shell 51. Even in the initial, unlocked, state, the tongues 512 are spaced substantially tangentially from the outside wall of the half-shell 51 and come into contact with the inside wall of the tube $T_2$ (shown in dashed line in FIG. 5). They bear elastically against this wall and the bearing force is sufficient to prevent slippage on commencement of the relative rotation of the two tubes $T_1$ and $T_2$. When the two half-shells, and in particular the half-shell 51, move(s) towards the inside wall of the tube $T_2$, the tongues 512 retract elastically to allow the outside wall of the half-shell 51 to move towards the inside wall of the tube $T_2$ and apply to the latter the friction force previously described. Self-locking elastic means can also be provided on the first half-shell 50.

Figure 6:
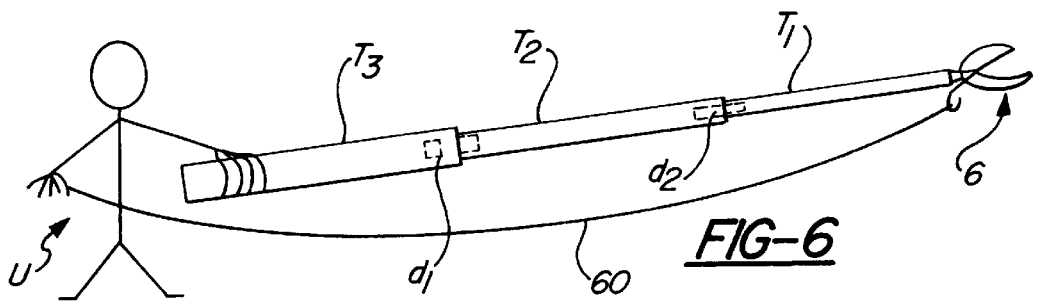
FIG. 6 shows the application of this device to the manufacture of a telescopic rod.

The device that has just been described can be used to immobilize any pair of sliding tubes and has a particular application in the manufacture of telescopic rods. Clearly, in this application in particular, a plurality of tubes may be butt-jointed in pairs. A device of the invention is required for each pair. By way of non-limiting example, FIG. 6 shows one example of a telescopic rod comprising three tubes: $T_1$ through $T_3$. In this case two assembly and locking devices $d_1$ and $d_2$ of the invention are provided. The relative diameters of the various components must naturally be determined appropriately, so that the tubes can slide one within another and so that they can be locked in a satisfactory manner.

This figure also shows a tool 6 (secateurs) at the end of the rod and means 60 enabling the user U to operate the tool 6.

Although up till now it has been assumed that the tubes $T_1$ and $T_2$ to be assembled together slide one within the other, the invention is not limited to this arrangement. It is also possible to assemble and lock two tubes that are identical in at least having the same inside diameter.

Figure 7:
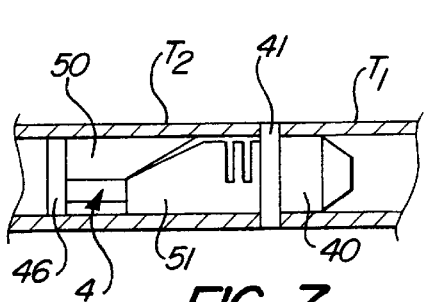
FIGS. 7 and 8 show additional embodiments of the device of the invention, applied to the butt-jointing of tubes.

FIG. 7 shows a first embodiment. In this figure, only the components essential to a proper understanding of the invention have been identified, using the same reference numbers as those used for the device of FIGS. 3 through 5.

The general construction of the device in the FIG. 7 embodiment is very similar to that just described. The only significant difference is that the flange 41 between the front part of the central member 4 and its rear part has a diameter substantially equal to the common diameter of the two tubes $T_1$ and $T_2$. The latter abut against the flange 41, one on each side. The rear part 40 of the central member 4 is forcibly inserted into the tube $T_1$ or fixed by any conventional means (screws or otherwise). As previously, the front part of the central member 4 is inserted in the tube $T_2$. The locking and unlocking process is exactly the same as that previously described.

Figure 8:
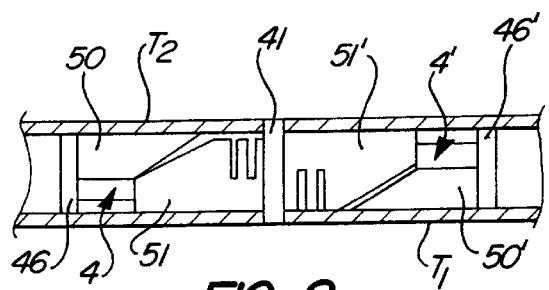

FIG. 8 shows a second embodiment enabling two tubes the same diameter to be butt-jointed.

This embodiment of the device is entirely symmetrical about the intermediate flange 41. The latter has the same dimensional characteristics as the embodiment described with reference to FIG. 7. To be more precise, the rear part (40) is eliminated in this figure and replaced by a second screwthreaded assembly 4', including an abutment flange 46'. The second screwthreaded assembly is likewise surrounded by two half-shells 50' and 51'. These components have the same function as the components having the same reference number. There is no need to describe again how this dual part works.

Although the construction of this embodiment of the device is more complex, since the number of moving parts is doubled, it has the advantage of being self-locking on both sides and also of doubling the friction area. To obtain effective locking all that the user has to do is to grasp one tube in each hand and apply torsion to the combination.

A reading of the foregoing description shows clearly that the invention achieves the stated objectives.

The device is both simple and effective. It offers a large friction area, fitting perfectly to the shape of the inside wall of the tube(s) to be locked without risk of breaking the bearing members. Clamping and unclamping are gentle and progressive. In the preferred embodiment, using self-locking means provided simply by elastic tongues, the problem of slippage is avoided and clamping is achieved in all cases. The components may be manufactured by relatively low cost manufacturing processes, advantageously by injection molding of plastics material.

It must nevertheless be clear that the invention is not limited to the embodiments specifically described, in particular with reference to FIGS. 3 through 8.

It must also be clear that, although particularly well suited to the manufacture of telescopic rods or similar devices, in particular in the field of gardening, the invention is not restricted to this type of application alone. As has been shown, it applies equally well to all applications involving the assembly and locking of tubes, sliding or otherwise.

The screwthread 42 could be near the flange 46 and the rib 510 could be on the first half-shell 50, which in this case would be the only one to be mobile.

The part 43 could have a screwthread with the opposite hand to the screwthread 42, the two half-shells 50, 51 moving in opposite directions and towards each other when the central member 4 is rotated.

A rib could also be provided on the inside face of the tube T2.

There is claimed:

1. A device for assembling and locking two tubes by relative rotation thereof about a common axis, comprising a central member that is radially symmetrical about said axis and has a rear part adapted to be inserted into a first tube and a front part provided with a cylindrical screwthread over at least a portion of its length, and first and second wedge-shaped half-shells surrounding said front part and disposed head-to-tail, each half-shell being made from a cylindrical tube cut in a plane inclined to the tube axis and provided with rectilinear ramp surfaces, said rectilinear ramp surfaces forming a particular angle with said common axis, said front part being surrounded by said two half-shells and inserted in a second tube, said two half-shells bearing against each other through the intermediary of said rectilinear ramp surfaces in a first, unlocked state enabling movement in translation of said second tube, said second half-shell having an inside rib adapted to mesh in said cylindrical screwthread so that said second half-shell is entrained in translation parallel to said common axis towards said first half-shell when rotation is imparted to said central member about said axis, to cause said shells to engage each other, by sliding on said rectilinear ramp surfaces, and to move them progressively radially apart to bring about a second, locked, state in which outside cylindrical walls of said half-shells come into cylindrical bearing engagement with a cylindrical portion of the inside wall of said second tube.

2. The device claimed in claim 1 wherein said front part of said central member has a cylindrical free end portion terminating at a cylindrical flange forming an abutment for the first of said wedge-shaped half-shells and having a diameter substantially equal to the inside diameter of said second tube.

3. The device claimed in claim 1 wherein said front and rear parts of said central member are separated by a cylindrical intermediate flange having a diameter substantially equal to the inside diameter of said second tube, said first tube abuts against a first side of said flange and said second half-shell abuts on the other side in said first, unlocked state.

4. The device claimed in claim 1 wherein said second half-shell has at least one elastic tongue rubbing on the inside wall of said second tube and exerting a friction force when said central member is rotated to bring about self-locking of said device in said second tube.

5. The device claimed in claim 1 wherein said particular angle is in the range from 20° to 30°.

6. The device claimed in claim 1 wherein said first tube has an outside diameter less than the inside diameter of said second tube so that said first tube is able to slide inside said second tube.

7. The device claimed in claim 1 wherein said first and second tubes have the same inside diameter, said front and rear parts of said central member are separated by a cylindrical intermediate flange and said two tubes abut on respective opposite sides of said flange.

8. The device claimed in claim 7 wherein said rear part and said front part are identical so that said device is symmetrical about said cylindrical intermediate flange.

9. The application of a device as claimed in claim 1 to the manufacture of a telescopic rod.

10. The device claimed in claim 1 wherein said first half-shell has a rib engaged in a peripheral groove arranged in a front part of said central member, said rib of said first half-shell cooperating with said groove to prevent movement in translation of said first half-shell parallel to said common axis.

11. The device claimed in claim 1 wherein said central member and said two half-shells are adapted to be fabricated by injection moulding of plastic material.

12. The device claimed in claim 1 wherein said second half-shell comprises friction means engaging said second tube inside wall for preventing rotation of said second half-shell when said central member is rotated.

* * * * *

UNITED STATES PATENT AND TRADEMARK OFFICE
CERTIFICATE OF CORRECTION

PATENT NO : 5,897,268
DATED : April 27, 1999
INVENTOR(S): Deville

It is certified that error appears in the above-identified patent and that said Letters Patent is hereby corrected as shown below:

Column 8, line 5, after "claim" delete "1" and insert --12--.

Signed and Sealed this

Nineteenth Day of October, 1999

Attest:

Attesting Officer

Q. TODD DICKINSON

Acting Commissioner of Patents and Trademarks